United States Patent [19]

Caramaschi et al.

[11] Patent Number: 4,521,157
[45] Date of Patent: Jun. 4, 1985

[54] HELICOPTER ROTOR HUB

[75] Inventors: Vittorio Caramaschi, Gallarate; Pier L. Castelli, Busto Arsizio, both of Italy

[73] Assignee: Costruzioni Aeronautiche Giovanni Agusta S.p.A., Italy

[21] Appl. No.: 471,343

[22] Filed: Mar. 2, 1983

[30] Foreign Application Priority Data

Mar. 11, 1982 [IT] Italy ............................... 67302 A/82

[51] Int. Cl.³ .............................................. B64C 11/06
[52] U.S. Cl. .............................. 416/134 A; 416/244 R; 416/141
[58] Field of Search ............... 416/134 A, 138 A, 141, 416/244 R

[56] References Cited

U.S. PATENT DOCUMENTS

| 3,384,185 | 5/1968 | Fernandez | 416/244 C |
| 3,824,037 | 7/1974 | Mautz | 416/136 A |
| 4,156,583 | 5/1979 | Mayerjak | 416/134 A X |
| 4,195,967 | 4/1980 | Weiland | 416/134 A |
| 4,257,738 | 3/1981 | Schwarz et al. | 416/134 A |
| 4,321,013 | 3/1982 | Schwarz et al. | 416/229 R X |
| 4,352,632 | 10/1982 | Schwarz et al. | 416/134 A |
| 4,425,082 | 1/1984 | Mussi et al. | 416/134 A |

Primary Examiner—Everette A. Powell, Jr.
Attorney, Agent, or Firm—Kane, Dalsimer, Kane, Sullivan and Kurucz

[57] ABSTRACT

A helicopter rotor hub having a lobed shape defining a plurality of bridge structures each allowing the attachment of a respective blade; each bridge structure is formed of superimposed sections of three annular bands, of synthetic material, the intermediate one of which forms an outer frame extending around the whole of the periphery of the hub, while the other two define one of the said lobes and connect the said outer frame to an inner metal structure.

6 Claims, 2 Drawing Figures

HELICOPTER ROTOR HUB

BACKGROUND OF THE INVENTION

The present invention relates to a helicopter rotor hub.

Known helicopter rotor hubs are generally constituted by a metal plate having an axial through hole for each blade. Each of these through holes is limited, on the side facing the periphery of the hub, by an arm or bridge which serves as an attachment for the respective blade and permits the centrifugal forces applied by the respective blade to the hub to be transferred to a central shaft.

One of the main disadvantages of the above described known hubs lies in the fact that, because of the monolithic structure of the said bridging arms, partial yielding of one of these automatically involves, in a very short time, the separation of the respective blade.

SUMMARY OF THE INVENTION

The object of the present invention is that of providing a hub which will be free from the above described disadvantage, that is to say a hub in which the forces due to the centrifugal force can follow several alternative routes in such a way that yielding of a part of its structure no longer involves almost immediate separation of a blade.

The said object is achieved by the present invention in that it relates to a helicopter rotor hub of plate-like plan form having a plurality of apertures uniformly distributed about a central axis and each closed radially outwardly by a respective bridge extending peripherally of the said plate permitting the connection of a respective blade to the plate, characterised by the fact that it includes an inner support structure coaxial with the said axis, an outer annular frame extending along the said bridges, and an intermediate lobe structure rigidly connected both to the said inner structure and the said outer frame; the said intermediate structure including a plurality of annular elements each of which comprises a portion extending along a respective said bridge and a further portion connected to the said inner structure.

BRIEF DESCRIPTION OF THE DRAWINGS

Further characteristics and advantages of the present invention will become apparent from the following description with reference to the attached drawings, which illustrate a non-limitative embodiment thereof, in which.

DETAILED DESCRIPTION OF THE INVENTION

Figure 1:
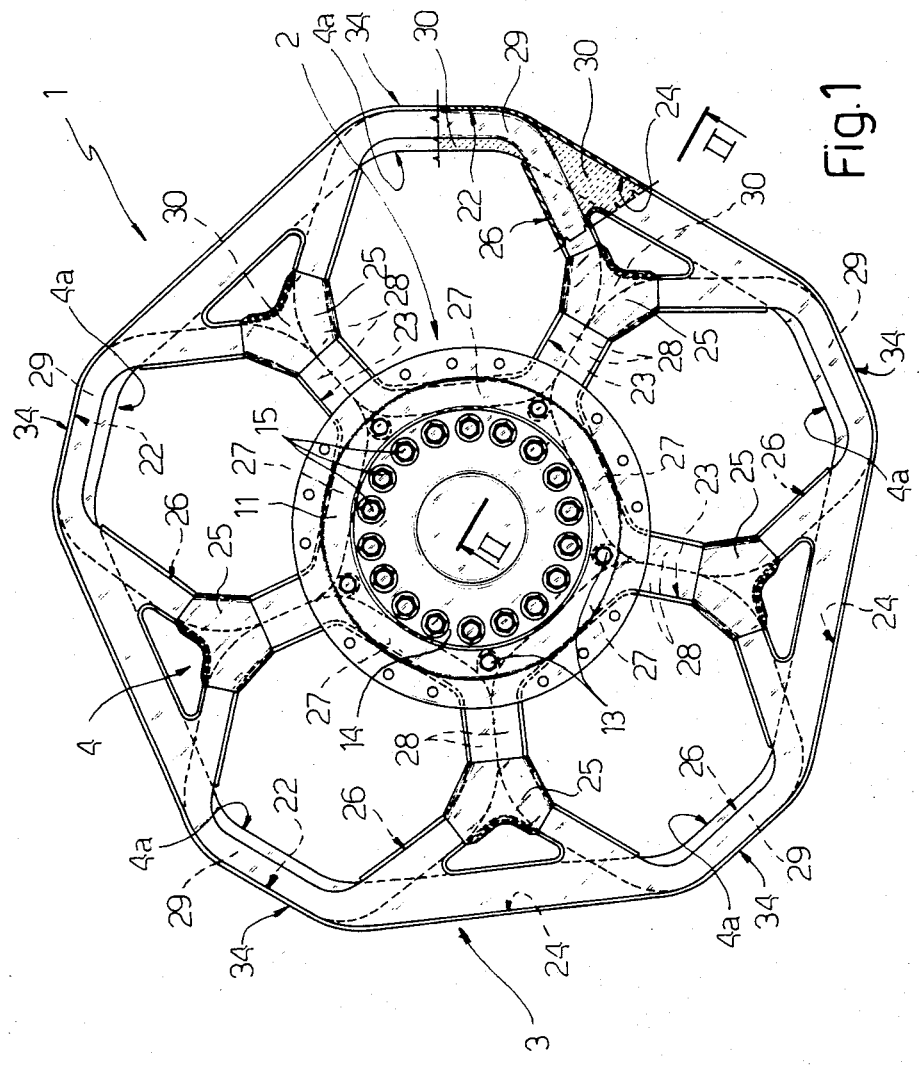
FIG. 1 illustrates in plan a helicopter rotor hub formed according to the principles of the present invention.
Figure 2:
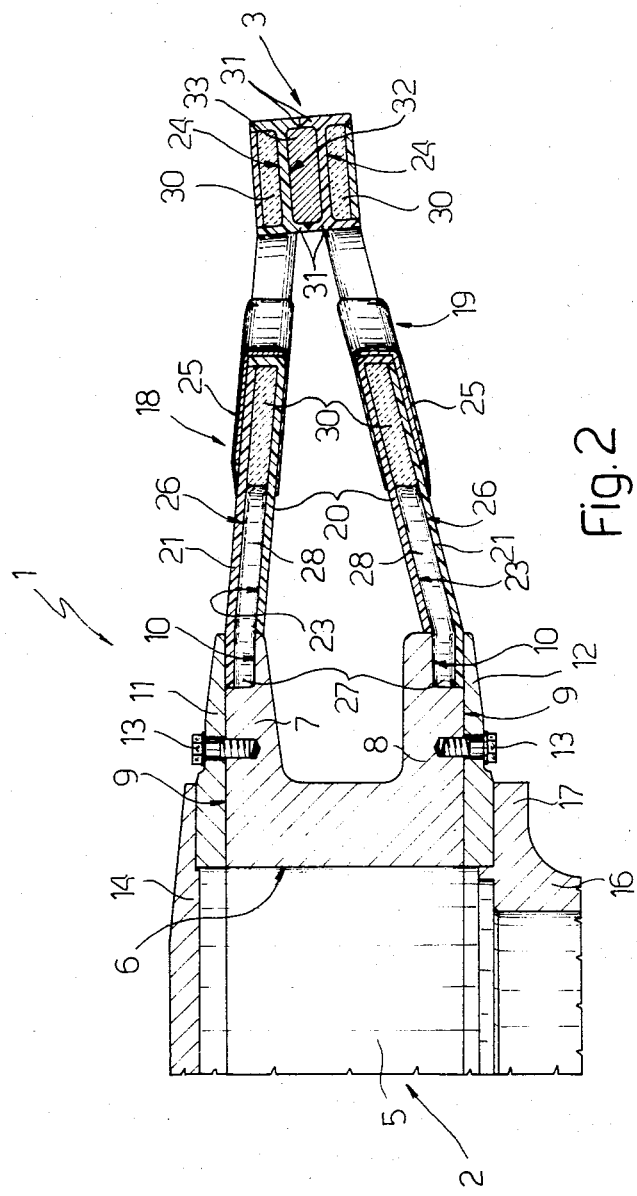
FIG. 2 is a section taken on the line II—II of FIG. 1.

FIGS. 1 and 2 illustrate a hub 1 of a helicopter rotor (not illustrated), having in plan the form of a plate with a polygonal perimeter for permitting the connection of a plurality a blades (not illustrated), of which there are five in the illustrated example, to a central shaft (not illustrated).

The hub 1 substantialy comprises an inner support structure 2, preferably metal, coaxial with a central axis of rotation of the hub 1, an outer annular frame 3, preferably made of synthetic fibres and coaxial with the said central axis, and an intermediate lobed structure 4, also preferably made from synthetic material and rigidly connected to the inner structure 2 and to the outer frame 3 to define apertures 4a each of which can receive an attachment element (not illustrated) of a blade.

As illustrated, in particular in FIG. 2, the inner structure 2 includes an annular body 5 positioned with its axis substantially vertically and traversed by an axial hole 6 of cylindrical form. The annular body 5 is provided externally, at its opposite axial ends, with two annular ribs 7 and 8 each having a flat surface 9 coplanar with the associated axial end surface of the body 5 and traversed by a plurality of arcuate outwardly concave channels 10 equal in number to the number of the said blades (not illustrated).

The channels 10 are closed by two annular plates 11 and 12, positioned in contact with the associated surfaces 9 and each connected to the associated rib 7, 8 by means of a ring of screws 13.

The assembly constituted by the annular body 5 and the plates 11 and 12 is preferably made of aluminium and is closed at the top by a cover 14, also preferably made of aluminium and connected to the plate 11 by a ring of screws 15 (FIG. 1). The annular body 5 is supported from below by a tubular body 16, preferably made of metal, and having an upper flange 17 connected to the plate 12 by screws (not illustrated).

As illustrated in FIG. 2, the intermediate structure 4 is composed of an upper portion 18 and a lower portion 19 both of frusto conical form and coaxial with the annular body 5, positioned tapering away from one another with their larger ends in contact across the frame 3.

Each portion 18,19 includes a holder 20 of synthetic material closed outwardly by a cover 21 of synthetic material defining on the interior of the holder 20 a plurality of U-shape channels 22 which are uniformly distributed around the intermediate structure 4 and are disposed radially with respect to this latter and concave towards it. Radially inwardly each channel 22 joins the two adjacent channels 22 to form two radial channels 23 of double width each of which extends towards the inner structure 2 and is disposed with its outer end facing the middle of a peripheral channel 24 perpendicular to the said channel 23 and communicating at its opposite ends with the channels 22 extending from this latter. At the junction of the two adjacent channels 22 with a radial channel 23 the holder 20 is reinforced by an outer covering element 25.

Within each holder 20 are disposed bands 26 of synthetic material, preferably reinforced with axially oriented fibres. Each band 26 has, in plan, the annular plan illustrated in broken outline, a first section 27 of which occupies an associated channel 10 and is connected to two further opposite sections 28 extending along respective channels 23. The free ends of the sections 28 are connected together by a section 29 in the form of the curved broken line extending along an associated channel 22.

As illustrated in FIG. 1 the inner space within each holder 20 not occupied by the bands 26 is occupied by a filling of synthetic material 30. Along their outer peripheries the holders 20 have two annular axial ribs 31 (FIG. 2) defining between them a channel 32 occupied by an annular band 33 constituting the outer frame 3 and extending parallel to the channels 24 and to an outer part of the channels 22.

The bands 33 constitute, together with the outer parts of the bands 26, the bridge structures 34 each of which closes a respective aperture 4a on the outer side and is able to support one of the said blades (not illustrated).

In use the intermediate lobed structure 4 and the outer frame 3 contribute to the uniform distribution of the forces due to the centrifugal force applied by the blades, and transmit these to the inner structure 2.

A particularity of the hub 1 described is constituted by the fact that both the two bands 26 and the band 33 pass through each bridge structure 34. This latter, in the event of breakage of one or of both of the bands 26 of a structure 34, is able to transfer the forces applied to this latter by the centrifugal force to the remaining bands 26 thereby preventing the sudden collapse of the hub 1.

We claim:

1. A helicopter rotor hub of plate-like plan form having a plurality of apertures (4a) uniformly distributed about a central axis and each closed radially outwardly by a respective bridge (34) extending peripherally of the said plate permitting the connection of a respective blade to the plate, characterised by the fact that it includes an inner support structure (2) coaxial with the said axis, an outer annular frame (3) extending along the said bridges (34), and an intermediate lobe structure (4) rigidly connected both to the said inner structure (2) and to the said outer frame (3); the said intermediate structure including a plurality of annular elements (26) each of which comprises an annular band of oriented synthetic fibres and having a portion (29) extending along a respective said bridge (34) and a further portion (27) connected to the said inner structure (2).

2. A hub according to claim 1, characterised by the fact that the said intermediate structure (4) and the said outer frame (3) are made of synthetic material.

3. A hub according to claim 1, characterised by the fact that the said inner structure (2) is made of metal.

4. A hub according to claim 1, characterised by the fact that the said outer frame (3) includes an annular band (33) of oriented synthetic fibres.

5. A hub according to claim 1, characterised by the fact that the said intermediate structure (4) includes an upper portion (18) and a lower portion (19) of frusto-conical form coaxial with the said central axis and disposed with their small ends facing away from one another and their major bases in contact with one another with the said outer annular frame (3) interposed between them; each of the said upper and lower portions (18) (19) including a plurality of the said annular elements (26).

6. A hub according to claim 5, characterised by the fact that each said upper and lower portion (18), (19) includes a respective outer holder (20) having channels (22), (23) occupied by the said annular elements (26); the said two holders (20) cooperating together to define an outer peripheral channel (32) occupied by the said outer annular frame (3).

* * * * *